W. MITCHELL.
GUARD FOR STALLS.
APPLICATION FILED FEB. 8, 1913.
1,215,569.
Patented Feb. 13, 1917.
2 SHEETS—SHEET 1.
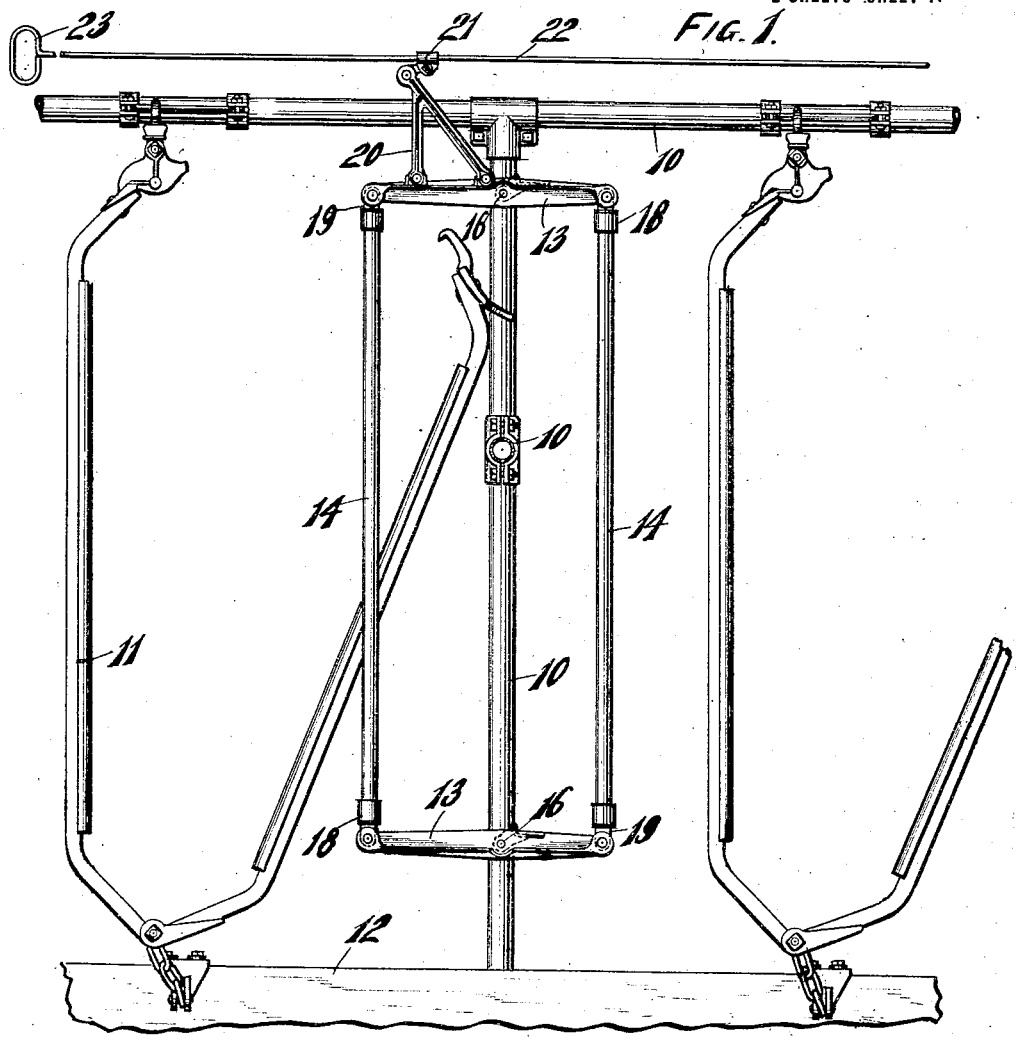
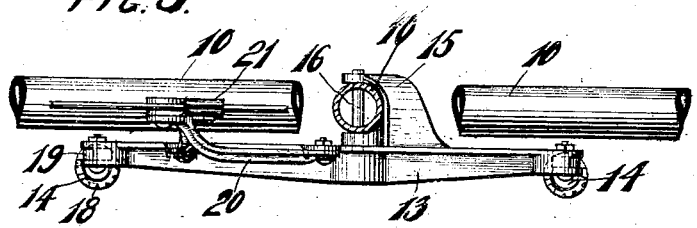
WITNESSES.
INVENTOR.
William Mitchell.
By Morrell & Caldwell
ATTORNEYS.

W. MITCHELL.
GUARD FOR STALLS.
APPLICATION FILED FEB. 8, 1913.
1,215,569.
Patented Feb. 13, 1917.
2 SHEETS—SHEET 2.
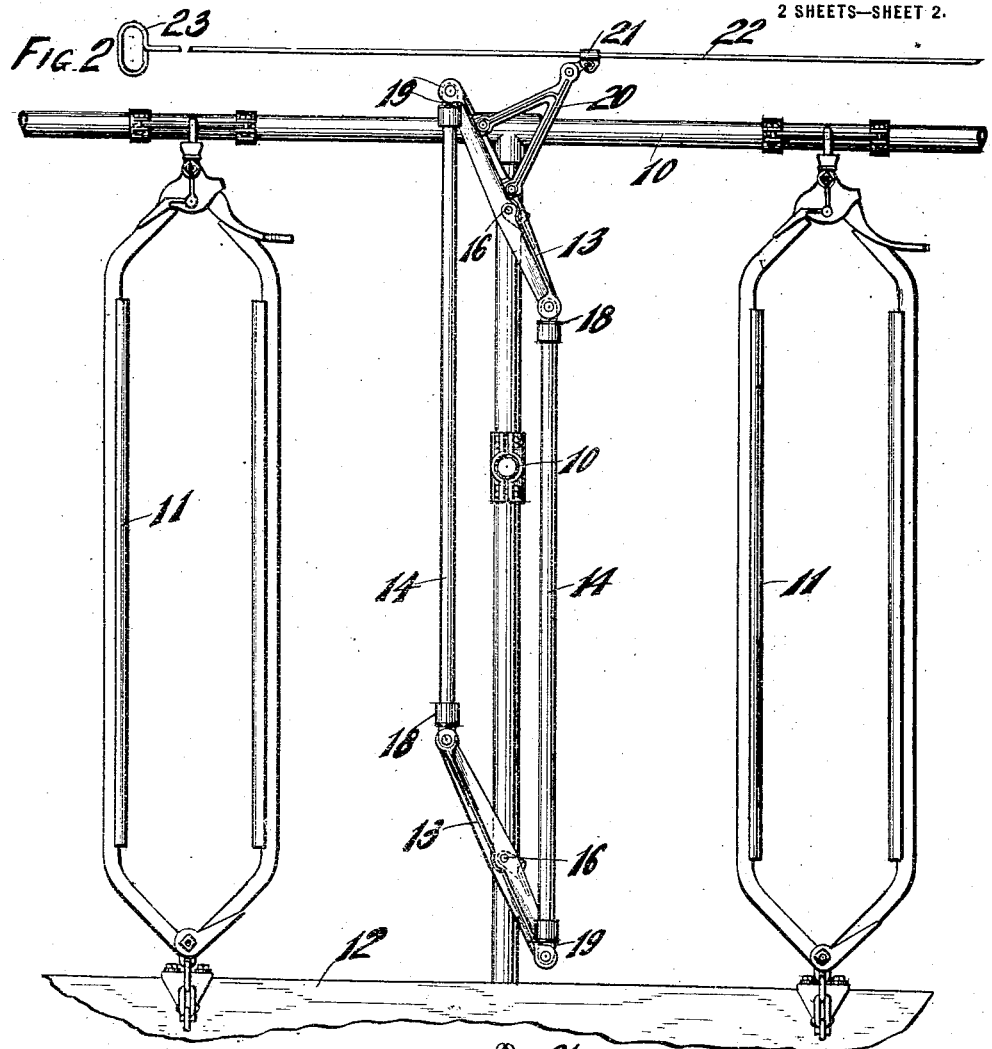
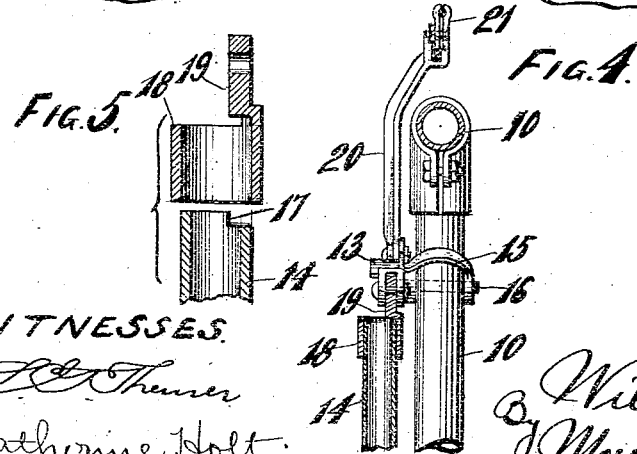
WITNESSES.
INVENTOR
William Mitchell.
Morsell & Caldwell.
ATTORNEYS

UNITED STATES PATENT OFFICE.

WILLIAM MITCHELL, OF MILWAUKEE, WISCONSIN.

GUARD FOR STALLS.

1,215,569.  Specification of Letters Patent.  Patented Feb. 13, 1917.

Application filed February 8, 1913. Serial No. 747,007.

*To all whom it may concern:*

Be it known that I, WILLIAM MITCHELL, a citizen of the United States, and resident of Milwaukee, in the county of Milwaukee and State of Wisconsin, have invented new and useful Improvements in Guards for Stalls, of which the following is a description, reference being had to the accompanying drawings, which are a part of this specification.

This invention has for its object to provide a guard for cattle stalls which will prevent the animals when driven into the stalls from placing their heads through the openings between the stanchions and the stall frames, leaving the only available opening within the open stanchions.

Another object of the invention is to provide such guards with means for simultaneously operating them throughout the line of stalls.

With the above and other objects in view the invention consists in the guard for stalls as herein claimed and all equivalents.

Referring to the accompanying drawings in which like characters of reference indicate the same parts in the different views:

Figure 1 shows a guard for stalls constructed in accordance with this invention, the guard being in its open or effective position;

Fig. 2 is a similar view thereof with the guard in its closed or ineffective position;

Fig. 3 is a detail plan view of the guard showing its supporting connection with the stall frame;

Fig. 4 is an end view thereof with the guard bars sectioned to show the connecting means thereof; and, Fig. 5 is a detail view of the pivotal connection of the guard bars before being assembled.

In these drawings 10 indicates a stall frame of tubular metal construction with the stanchions 11 mounted thereon and connected with the sill 12 in an ordinary manner to allow a freedom of movement laterally.

A pair of levers 13 are pivotally connected at an intermediate point to the upright standard of the stall frame forming a division between the stall, one of said levers being located near the lower end of the standard and the other near the upper end of the standard and to the ends of these levers are pivotally connected vertical guard bars 14 which because of the corresponding location of the pivotal connections of the two levers remain parallel during swinging movements of the lever, but move nearer together or farther apart as shown in Figs. 1 and 2 when the levers swing from one position to another. Preferably the pivotal mounting of the levers on the standard is effected by means of a bracket arm 15 extending from the lever to partially embrace the standard and provided with a pivot pin 16 passing through it and through the standard and lever as best seen in Fig. 3. This arm 15 assures a strong pivotal connection besides serving as a stop for limiting the swinging movements of the lever by engaging the standard when the lever is in its horizontal position, or the position in which the guard bars 14 are farthest apart. Any suitable form of pivotal connection may be provided for the guard bars 14, but the form shown in Fig. 5 is preferable wherein the tubular guard bar has a notch 17 cut in its end and a sleeve 18 is fitted over the end of the tube with an inwardly set pivotal ear 19 fitting within the notched portion, the unnotched edge of the tube then being turned over the edge of the sleeve 18 in the manner shown in Fig. 4. The pivotal ear 19 forms the pivotal connection for the guard bar and this manner of connecting it to the guard bar assures a permanent connection.

Any desirable means may be provided for swinging the levers 13. As shown a bracket 20 is bolted or otherwise secured to the upper portion of one end of the upper lever and extends above the stall frame where it has a pivotal connection with a rod clamp 21 which is adjustably fixed on an operating rod 22 running the length of the row of stalls and provided with suitable means, such as a handle 23, for moving it lengthwise to effect the operation of all of the stall guards simultaneously.

In operation the rod 22 is moved in a direction to cause all of the stall guards to open out into their extended or effective position, as shown in Fig. 1, at the time the stanchions are opened and before driving the cattle into the stalls. The cattle finding the space between the stanchions and the stall frames occupied by the guard bars 14 will place their heads through the stanchions as desired and the stanchions may then be closed and the rod 22 moved to the other position so as to collapse or close the stall guards to their ineffective position as shown in Fig. 2 so as not to interfere with the freedom of movement of the animals.

What I claim as new and desire to secure by Letters Patent is:

1. A stall guard, comprising a collapsible guard frame adapted for connection with the division standard of a stall frame for occupying space between said standard and the adjacent stanchions to prevent the animal entering its head between the standard and the stanchions when driven into the stall.

2. A stall guard, comprising a collapsible frame in the form of a parallelogram adapted to be mounted on the division standard of the stall frame with its upright members forming guard bars positioned between the standard and the stanchions in the operative position of the frame.

3. A stall guard, comprising a pair of levers pivotally connected at intermediate points to the division standard of a stall frame, upright guard bars pivotally connecting the ends of the levers, and means for swinging the levers to cause the guard bars to occupy positions between the standard and the stanchions.

4. A stall guard for a row of stall frames provided with stanchions, comprising a pair of levers pivotally connected with the division standard of the stall frame, upright guard bars pivotally connected to the ends of the levers, a bracket on one end of one of the levers, and an operating rod extending lengthwise of the row of stalls and having the bracket pivotally connected therewith.

5. A stall guard, comprising a pair of levers having bracket arms to engage the division standard of a stall frame to form a pivotal connection therewith and to form a stop for limiting the pivotal movements of the levers by engaging the standard, guard bars pivotally connected to the levers adjacent both sides of the standard, and means for swinging the levers.

6. The combination with a row of stall frames provided with stanchions and having division standards between the stalls, of guard means operatively connected together and extending on either side of each of said standards movable to positions between the standard and the adjacent stanchions and means for simultaneously operating said guard means.

7. The combination with a row of stall frames provided with stanchions and having division standards between the stalls, of guard means operatively connected together and pivotally secured to each of said standards movable to positions between the standard and the adjacent stanchions to prevent the animals from entering their heads between the standard and the stanchions and means for simultaneously operating said guard means.

8. The combination with a row of stall frames provided with stanchions and having division standards between the stalls, of guard means extending on either side of each of said standards movable to position between the standard and the adjacent stanchions, and means for simultaneously operating said guard means.

9. The combination, with a row of stall frames provided with stanchions and having division standards between the stalls, of movable guards secured to each of said standards for simultaneously occupying space between each standard and the adjacent stanchions to prevent the animals entering their heads between the standard and the stanchions when driven into the stalls and means for simultaneously operating said guards.

10. The combination, with a row of stall frames provided with stanchions and having division standards between the stalls, of movable guards mounted on the stall frames, means for simultaneously moving said guards to position between the standard and the adjacent stanchions to prevent the animals entering their heads between said standards and stanchions when driven into the stalls and to position away from the stanchions when the animals are in the stalls to permit free movement of the animals therein.

In testimony whereof, I affix my signature, in presence of two witnesses.

WILLIAM MITCHELL.

Witnesses:
C. H. KEENEY,
EMILY SCHOWALTER.

Copies of this patent may be obtained for five cents each, by addressing the "Commissioner of Patents, Washington, D. C."

DISCLAIMER.

1,215,569.—*William Mitchell*, Milwaukee, Wis. GUARD FOR STALLS. Patent dated February 13, 1917. Disclaimer filed June 16, 1928, by the assignee, *Mitchell Mfg. Co.*

Therefore disclaims any interpretation being given to such of the claims of said patent as are referred to in the decision of said circuit court of appeals which would be in conflict with said decision, and that such claims be limited as provided for in the decision, but without waiving any right of petitioner to the application of the doctrine of mechanical equivalency in the interpretation of such claims.

[*Official Gazette July 10, 1928.*]